United States Patent
Goel et al.

(10) Patent No.: US 11,778,075 B2
(45) Date of Patent: Oct. 3, 2023

(54) DYNAMIC ROBUST DOWNLINK PACKET DELIVERY

(71) Applicant: AltioStar Networks, Inc., Tewksbury, MA (US)

(72) Inventors: Anupam Kumar Goel, Bangalore (IN); Rachit Srivastava, Bangalore (IN)

(73) Assignee: Altiostar Networks, Inc., Tewksbury, MA (US)

( * ) Notice: Subject to any disclaimer, the term of this patent is extended or adjusted under 35 U.S.C. 154(b) by 0 days.

(21) Appl. No.: 17/666,025

(22) Filed: Feb. 7, 2022

(65) Prior Publication Data

US 2022/0286535 A1    Sep. 8, 2022

Related U.S. Application Data

(63) Continuation of application No. 16/571,708, filed on Sep. 16, 2019, now Pat. No. 11,245,779, which is a continuation of application No. 14/932,348, filed on Nov. 4, 2015, now Pat. No. 10,432,758.

(51) Int. Cl.
| | |
|---|---|
| *H04L 69/22* | (2022.01) |
| *H04L 1/00* | (2006.01) |
| *H04L 61/4511* | (2022.01) |
| *H04L 67/56* | (2022.01) |
| *H04L 67/60* | (2022.01) |

(52) U.S. Cl.
CPC .............. *H04L 69/22* (2013.01); *H04L 1/007* (2013.01); *H04L 1/0017* (2013.01); *H04L 1/0041* (2013.01); *H04L 61/4511* (2022.05); *H04L 67/56* (2022.05); *H04L 67/60* (2022.05)

(58) Field of Classification Search
None
See application file for complete search history.

(56) References Cited

U.S. PATENT DOCUMENTS

| | | | |
|---|---|---|---|
| 9,596,053 | B1 | 3/2017 | Marupaduga et al. |
| 10,432,758 | B2 | 10/2019 | Goel et al. |
| 10,521,780 | B1 | 12/2019 | Hopkins, III et al. |
| 11,245,779 | B2 | 2/2022 | Goel et al. |
| 2007/0115890 | A1 | 5/2007 | Yi et al. |
| 2014/0233479 | A1 | 8/2014 | Dahod et al. |
| 2016/0260169 | A1 | 9/2016 | Arnold et al. |
| 2017/0126853 | A1 | 5/2017 | Goel et al. |
| 2020/0014779 | A1 | 1/2020 | Goel et al. |

*Primary Examiner* — Alex Skripnikov
(74) *Attorney, Agent, or Firm* — Sughrue Mion, PLLC

(57) ABSTRACT

A data packet for delivery to a user equipment can be inspected. Based on the inspecting, whether to use a robust downlink delivery can be determined. Based on the determining, a robust modulation coding scheme (MCS) for the data packet can be selected. The data packet can be transmitted utilizing the selected robust MCS. At least one of the inspecting, the determining, the selecting, and the transmitting is performed using at least one processor of at least one computing system. Related apparatus, systems, techniques, and articles are also described.

29 Claims, 9 Drawing Sheets

DYNAMIC ROBUST DOWNLINK PACKET DELIVERY

CROSS-REFERENCE TO RELATED APPLICATIONS

The present application claims priority to and is a continuation of U.S. patent application Ser. No. 16/571,708 to Anupam Kumar Goel, et al., filed on Sep. 16, 2019, now U.S. Pat. No. 11,245,779, issued on Feb. 8, 2022, entitled "Dynamic Robust Downlink Packet Delivery", which claims priority to and is a continuation of U.S. patent application Ser. No. 14/932,348 to Anupam Kumar Goel, et al., filed on Nov. 4, 2015, now U.S. Pat. No. 10,432,758, issued on Oct. 1, 2019, and entitled "Dynamic Robust Downlink Packet Delivery", and incorporates their disclosures herein by reference in their entireties.

TECHNICAL FIELD

In some implementations, the current subject matter relates to robust downlink delivery of packets, for example, by dynamic selection of modulation and coding schemes.

BACKGROUND

In today's world, cellular networks provide on-demand communications capabilities to individuals and business entities. Typically, a cellular network is wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide guaranteed bandwidth within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if when mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile; in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. LTE is based on the GSM/EDGE and UMTS/HSPA digital cellular technologies and allows for increasing capacity and speed by using a different radio interface together with core network improvements.

Modern user equipment is capable of running various software applications that relate to email, Internet browsing, productivity, management, and/or any other types of software applications. Access to the internet can require a domain name system (DNS) query. For mobile devices, DNS response delay can increase internet access delay. Many conventional systems lack knowledge of the data being consumed by a user equipment and so treat all data packets generally, regardless of their importance to the user equipment.

SUMMARY

In an aspect, a data packet for delivery to a user equipment can be inspected. Based on the inspecting, whether to use a robust downlink delivery can be determined. Based on the determining, a robust modulation coding scheme (MCS) for the data packet can be selected. The data packet can be transmitted utilizing the selected robust MCS. At least one of the inspecting, the determining, the selecting, and the transmitting is performed using at least one processor of at least one computing system.

One or more of the following features can be included in any feasible combination. For example, the robust MCS can have a lower MCS index for a fixed channel quality than a non-robust MCS. The determining can be based on at least one predefined rule. The at least one predefined rule can include using robust downlink delivery when the data packet is carrying a response to a Domain Name System (DNS) query.

An evolved node (eNodeB) base station can perform at least one of the inspecting, the determining, the selecting, and the transmitting, the eNodeB base station including at least one processor and at least one memory. The at least one processor can include a packet scheduling processor and an application intelligence processor. The packet scheduling processor can select the robust MCS based on receipt of an enable instruction from the application intelligence processor.

The data packet can be inspected upon arrival at the base station. The inspecting can include inspecting the data packet to determine at least one of an application type of the data packet and an application state corresponding to the data packet. The application state can include at least one of the following: a data establishment state and a data transfer state. A packet header and a payload of a data packet can be inspected to determine the application type of the data packet. Whether to use robust downlink delivery can be determined based on the application type. A packet header and a payload of a data packet can be inspected to determine the application state corresponding to the data packet. Whether to use robust downlink delivery can be determined based on the application state.

The transmitting can include transmitting the data packet to a remote radio head including a radio transmitter and a radio receiver. A provider of the content corresponding to the data packet can be determined. Whether to use the robust downlink delivery for the data packet can be determined based on the determined provider.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein. Additionally, computer systems may include additional specialized processing units that are able to apply a single instruction to multiple data points in parallel.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

Some of the embodiments of the present disclosure will be described with reference to the following figures. It should be appreciated that the figures are provided for exemplary purposes. Items appearing in multiple figures are indicated by the same reference number in all the figures in which they appear.

DETAILED DESCRIPTION

To address deficiencies of currently available solutions, one or more implementations of the current subject matter relate to robust downlink packet delivery based on knowledge of the content of the data packet. Knowledge can include, for example, whether the data is for consumption by an application. The robust downlink packet delivery may be implemented in a base station (e.g., an eNodeB) and can be used to dynamically increase the likelihood of successful delivery of a given data packet to the user equipment. A data packet can be inspected to determine contents of the data packet (e.g., application type) and a determination made whether to use a conservative modulation and coding scheme (MCS) for transmission of the data packet to a user equipment to ensure robust downlink packet delivery. The appropriate robust MCS (e.g., conservative MCS) to use can be selected and the data packet can be scheduled for transmission using the robust MCS. While the methods and systems described herein are with reference to an LTE system, and in some instances an evolved node B (eNodeB) base station in a radio access network ("RAN") or a centralized cloud radio access network ("C-RAN"), the methods and systems described herein are applicable to other types of communication systems.

An LTE system is governed by a standard for wireless communication of high-speed data for mobile telephones and data terminals. The standard is based on the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard is developed by the 3GPP® ("3rd Generation Partnership Project").

Figure 1A:
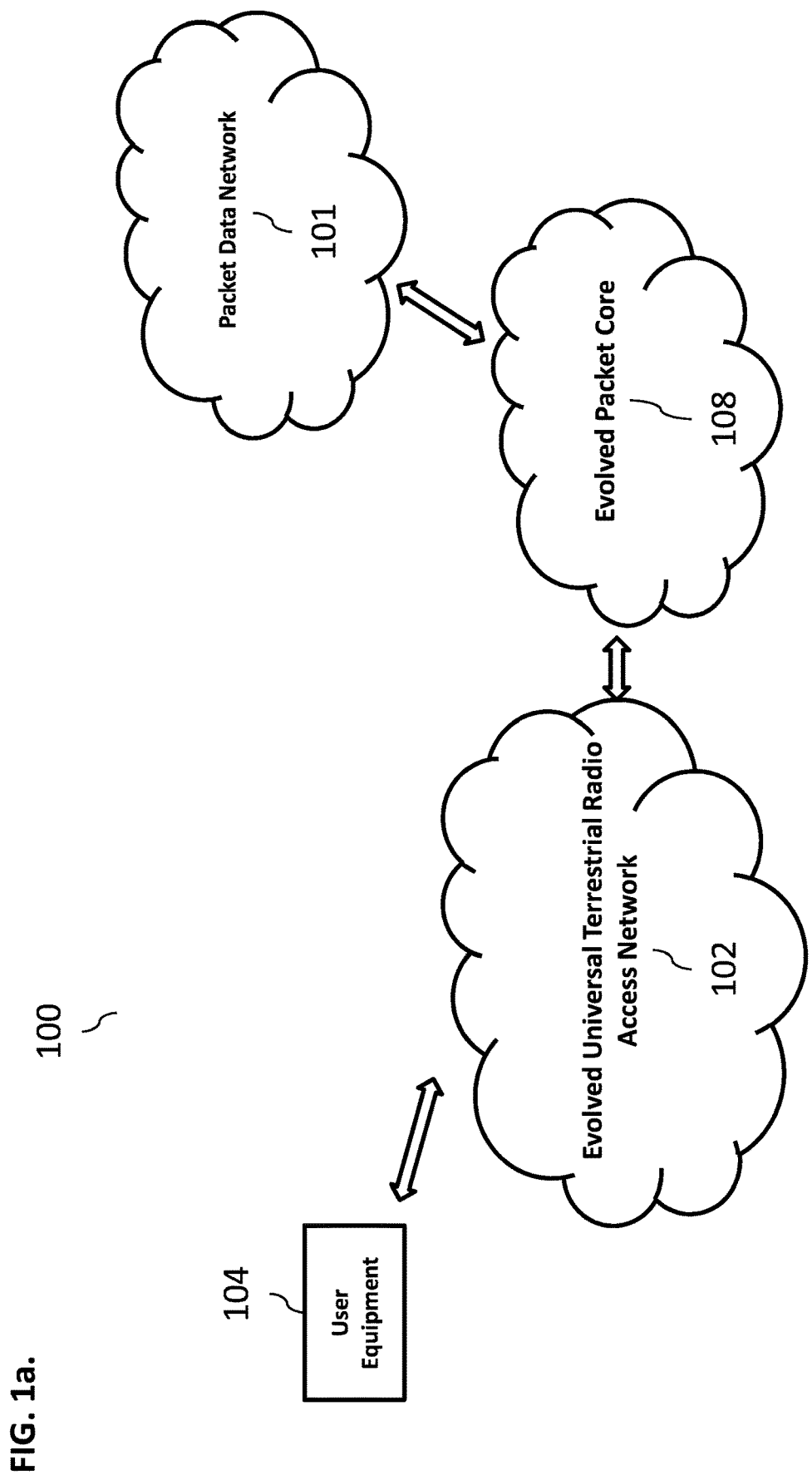
FIG. 1A illustrates an example of a long term evolution ("LTE") communications system.
Figure 1B:
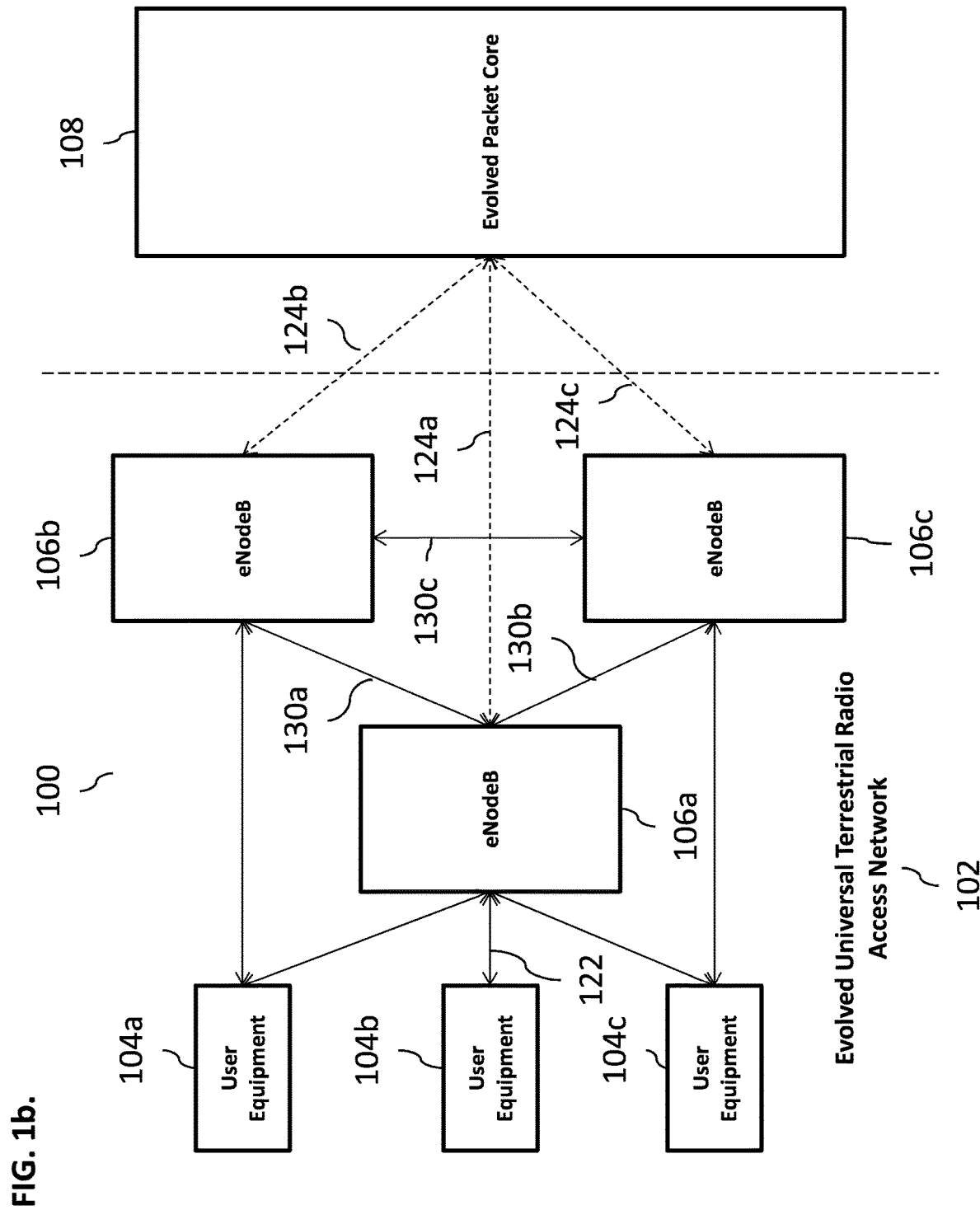
FIG. 1B illustrates example implementations of the LTE system shown in FIG. 1A.

FIG. 1A illustrates an example of a long term evolution ("LTE") communications system 100. FIG. 1B illustrates example implementations of the LTE system shown in FIG. 1A. As shown in FIG. 1A, the communications system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENB") or base stations 106 (a, b, c) (as shown in FIG. 1B) that provide communication capabilities to a plurality of user equipment 104(a, b, c). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

With reference to FIG. 1B, the EUTRAN 102 may include a plurality of eNodeBs 106, also known as cell sites. The eNodeBs 106 provides radio functions and performs key control functions including scheduling of air link resources or radio resource management, active mode mobility or handover, and admission control for services.

Figure 1C:
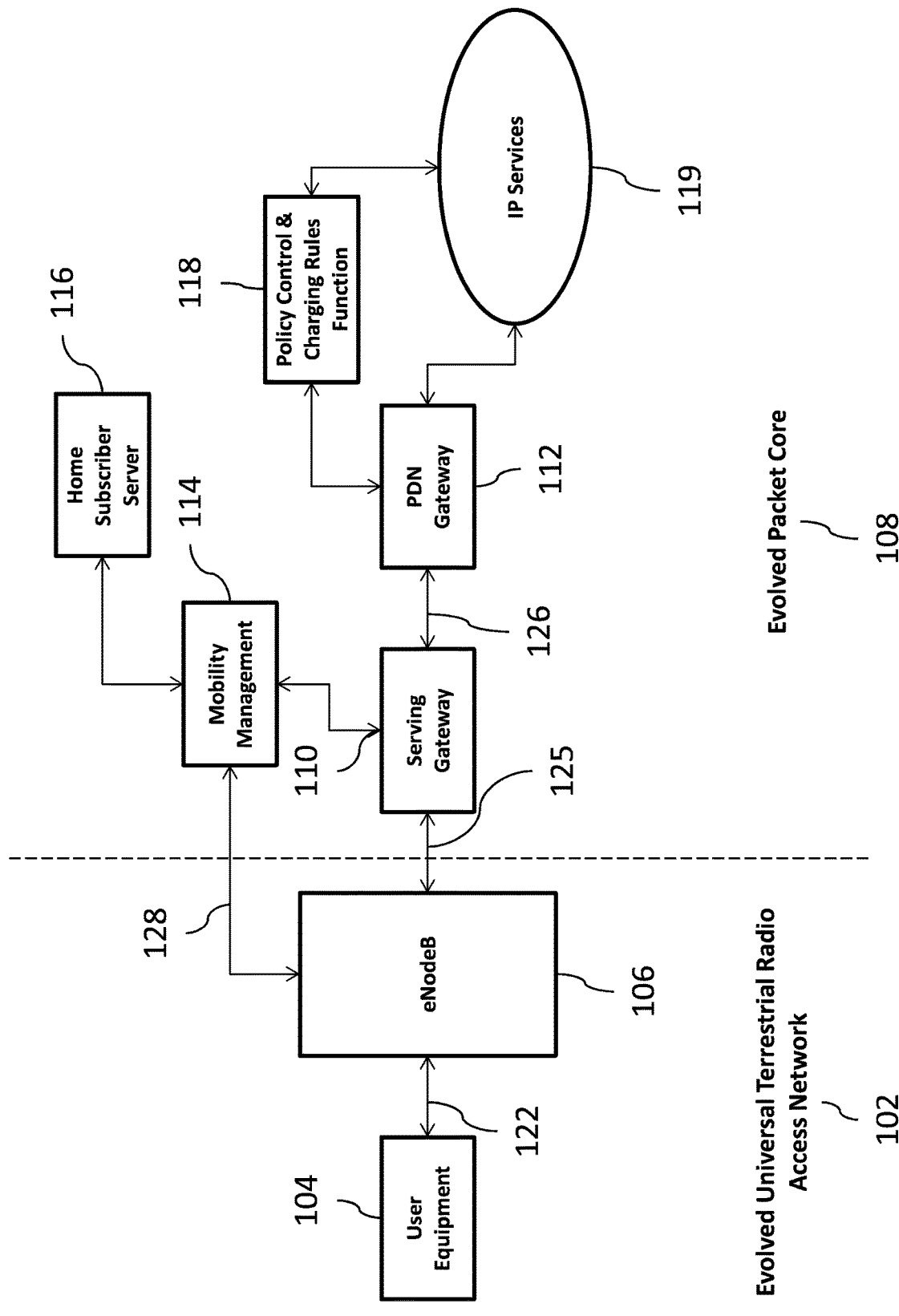
FIG. 1C illustrates an example network architecture of the LTE system shown in FIG. 1A.

FIG. 1C illustrates an example network architecture of the LTE system shown in FIG. 1A. As shown in FIG. 1C, the eNodeBs 106 are responsible for selecting which mobility management entities (MMEs) will serve the user equipment 104 and for protocol features like header compression and encryption. The eNodeBs 106 that make up an EUTRAN 102 collaborate with one another for radio resource management and handover as shown in FIG. 1C.

With reference to FIG. 1C, communication between the user equipment 104 and the eNodeB 106 occurs via an air interface 122 (also known as "LTE-Uu" interface). As shown in FIG. 1B, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1c). In addition to signaling, user traffic is transferred between the user equipment 104 and eNodeB 106. Both signaling and traffic in the communications system 100 are carried by physical layer ("PHY") channels.

Multiple eNodeBs 106 can be interconnected with one another using an X2 interface 130(a, b, c). As shown in FIG. 1a, X2 interface 130a provides interconnection between eNodeB 106a and eNodeB 106b; X2 interface 130b provides interconnection between eNodeB 106a and eNodeB 106c; and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124(a, b, c). The S1 interface 124 can be split into two interfaces: one for the control plane (shown as control plane interface (S1-MME interface) 128 in FIG. 1C) and the other for the user plane (shown as user plane interface (S1-U interface) 125 in FIG. 1C).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to interwork with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1C. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1a). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMES in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QoS class identifier ("QCI") and bit rates) that decides how a certain data flow will be treated in the PCEF and ensures that this is in accordance with the user's subscription profile. As stated above, the IP services 119 are provided by the PDN 101 (as shown in FIG. 1A).

According to some implementations, the LTE network includes splitting the base station functionalities into a baseband unit (BBU), which performs, in particular, the scheduling and the baseband processing functions, and a number of remote radio heads (RRHs) responsible for RF transmission and/or reception of signals. The baseband processing unit is typically located at the center of the cell and is connected via optical fiber to the RHs. This approach allows a baseband processing unit to manage different radio sites in a central manner. Furthermore, having geographically separated RHs controlled from the same location enables either centralized baseband processing units jointly managing the operation of several radio sites, or the exchange of very low-latency coordination messages among individual baseband processing units.

The open base station architecture initiative (OBSAI) and the common public radio interface (CPRI) standards introduced standardized interfaces separating the base station server and the RRH part of a base station by an optical fiber.

Figure 1D:
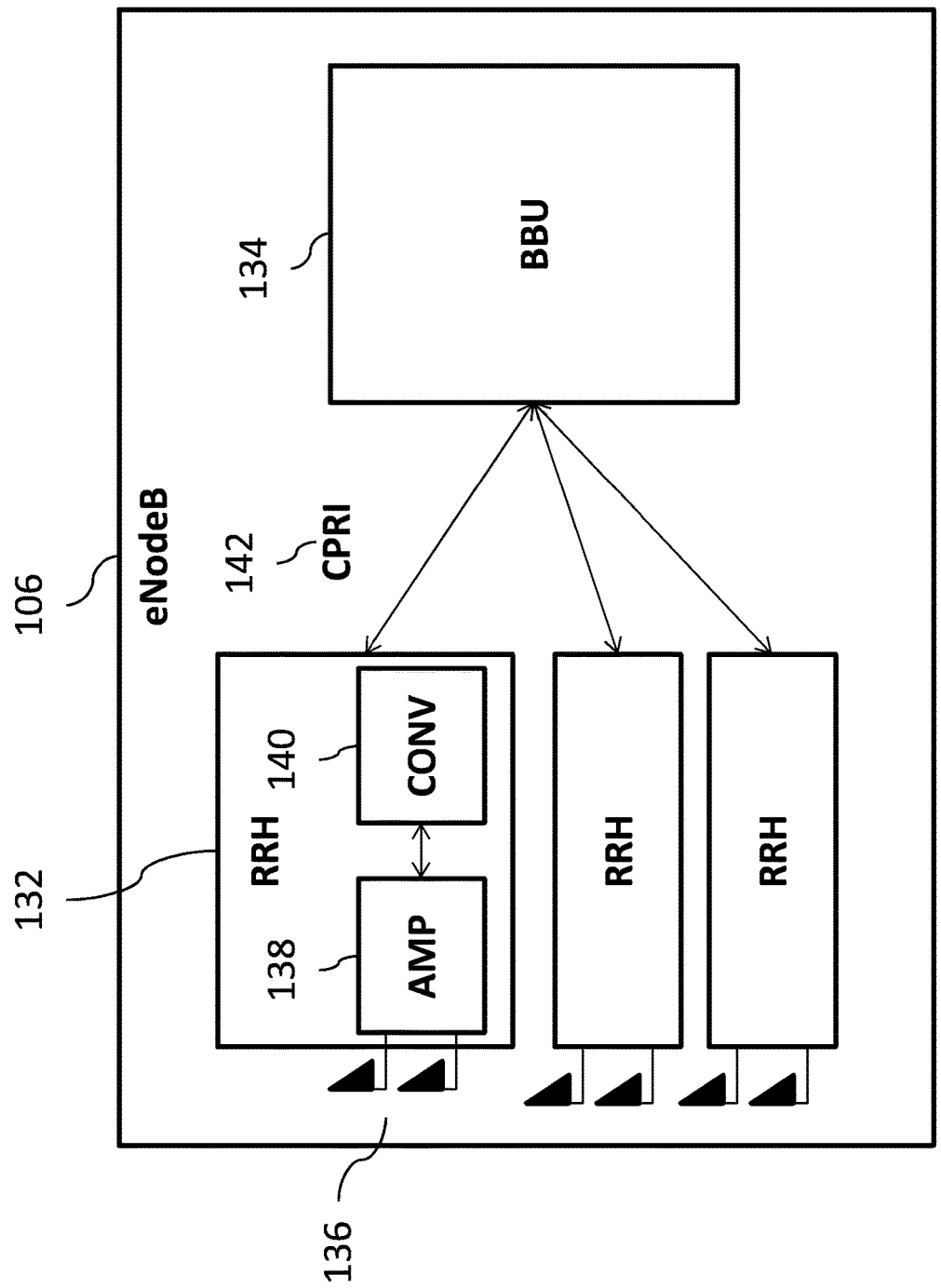
FIG. 1D illustrates an example structure of an evolved node B (eNodeB) base station according to some implementations.

FIG. 1D illustrates an example structure of an evolved node B (eNodeB) base station 106 according to some implementations. The eNodeB 106 can include at least one remote radio head ("RRH") 132 (for example, there can be three RRH 132) and a baseband unit ("BBU") 134. The RRH 132 can be connected to antennas 136. The RRH 132 and the BBU 134 can be connected using an optical interface that is compliant with common public radio interface ("CPRI") 142 standard specification. The operation of the eNodeB 106 can be characterized using standard parameters and specifications for radio frequency band, bandwidth, access scheme (e.g., downlink: OFDMA; uplink: SC-OFDMA for LTE), antenna technology, number of sectors, maximum transmission rate, S1/X2 interface, and/or mobile environment. For example, these values may be set based on standards and specifications defined for LTE and/or a next generation architecture. The BBU 134 can be responsible for digital baseband signal processing, termination of S1 line, termination of X2 line, call processing and monitoring control processing. IP packets that are received from the EPC 108 (not shown in FIG. 1d) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1d). Conversely, the RF signals that are received from user equipment 104 are amplified (using AMP 138) and converted (using CONV 140) to digital baseband signals for transmission to the BBU 134.

Figure 2:
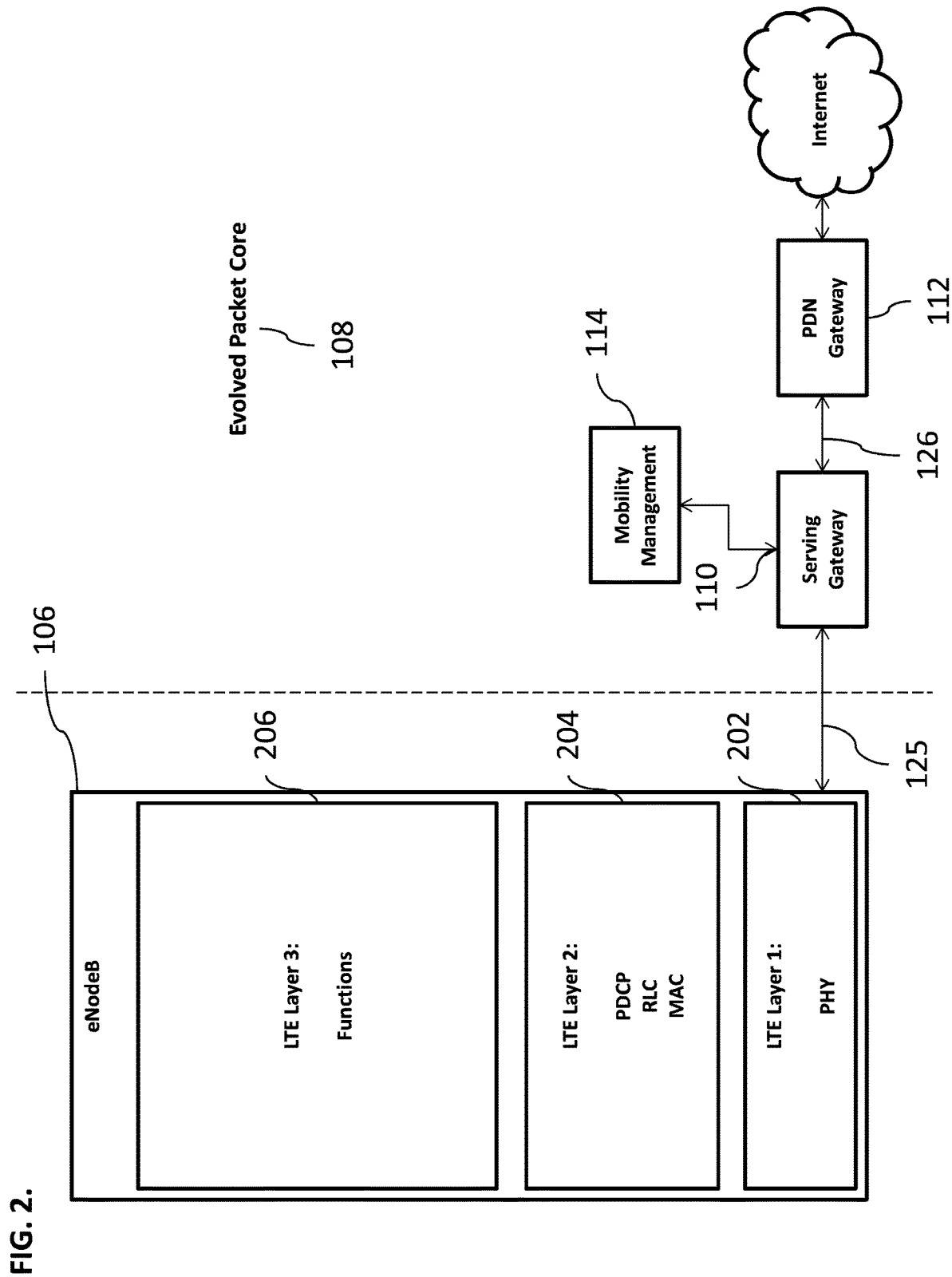
FIG. 2 illustrates an example structure of functional layers of an evolved node B (eNodeB) base station and an interface to a core network of the LTE system shown in FIGS. 1A-1D.

FIG. 2 illustrates an example structure of functional layers of an evolved node B (eNodeB) base station and an interface to a core network of the LTE system shown in FIGS. 1A-1D. The eNodeB 106 includes a plurality of layers: LTE layer 1 202, LTE layer 2 204, and LTE layer 3 206. The LTE layer 1 incudes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). Each of these layers are discussed in further detail below.

Figure 3:
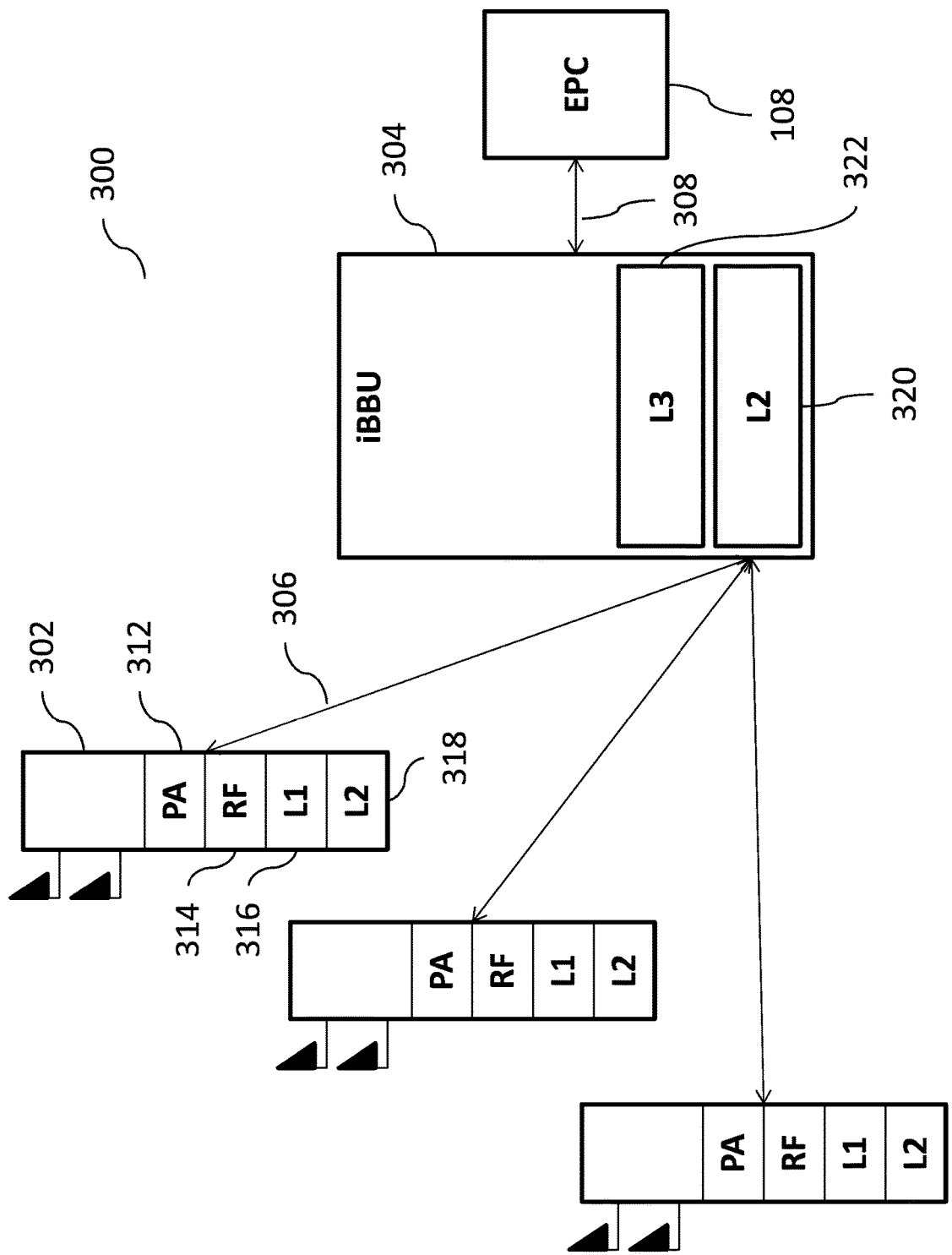
FIG. 3 illustrates another example structure of functional layers of an evolved node B (eNodeB) base station of the LTE system shown in FIGS. 1A-1D.

FIG. 3 illustrates another example structure of functional layers of an evolved node B (eNodeB) base station of the LTE system shown in FIGS. 1A-1D. The system 300 can be implemented as a centralized cloud radio access network ("C-RAN"). The system 300 can include at least one intelligent remote radio head ("iRRH") unit 302 and an intelligent baseband unit ("iBBU") 304. The iRRH 302 and iBBU 304 can be connected using Ethernet fronthaul ("FH") communication 306 and the iBBU 304 can be connected to the EPC 108 using backhaul ("BH") communication 308. The user equipment 104 (not shown in FIG. 3) can communicate with the iRRH 302.

In some implementations, the iRRH 302 can include the power amplifier ("PA") module 312, the radio frequency ("RF") module 314, LTE layer L1 (or PHY layer) 316, and a portion 318 of the LTE layer L2. The portion 318 of the LTE layer L2 can include the MAC layer and can further include some functionalities/protocols associated with RLC and PDCP, as will be discussed below. The iBBU 304 can be a centralized unit that can communicate with a plurality of iRRH and can include LTE layer L3 322 (e.g., RRC, RRM, etc.) and can also include a portion 320 of the LTE layer L2. Similar to portion 318, the portion 320 can include various functionalities/protocols associated with RLC and PDCP. Thus, the system 300 can be configured to split functionalities/protocols associated with RLC and PDCP between iRRH 302 and the iBBU 304.

One of the functions of the eNodeB 106 referred to in Layer 3 of FIG. 1C is radio resource management ("RRM"), which includes scheduling of both uplink and downlink air interface resources for user equipment 104, control of bearer resources, and admission control. The RRM function is to ensure efficient use of the available network resources. In particular, RRM in E-UTRAN provides a means to manage (e.g., assign, reassign, and release) radio resources in single and multi-cell environments. RRM may be treated as a central application at the eNB responsible for interworking between different protocols (RC, S1AP, and X2AP) so that messages can be properly transferred to different nodes across Uu, S1, and X2 interfaces. RM may interface with operation and management functions in order to control, monitor, audit, or reset the status due to errors at a protocol stack. Radio admission control: The RAC functional module accepts or rejects requests for the establishment of new radio bearers.

The RRM includes modules for radio bearer control (RBC). The RBC functional module manages the establishment, maintenance, and release of radio bearers. The RRM also includes modules for connection mobility control (CMC) The CMC module manages radio resources in the idle and connected modes. In the idle mode, this module defines criteria and algorithms for cell selection, reselection, and location registration that assist the UE in selecting or camping on the best cell. In addition, the eNB broadcasts parameters that configure the UE measurement and reporting procedures. In the connected mode, this module manages the mobility of radio connections without disruption of services.

The RRM may also include modules for dynamic resource allocation (DRA) and/or packet scheduling (PS). The task of DRA or PS is to allocate and de-allocate resources (including physical resource blocks) to user and control-plane packets. The scheduling function typically considers the QoS requirements associated with the radio bearers, the channel quality feedback from the UEs, buffer status, inter-cell/intra-cell interference condition, and the like. The DRA function may take into account the restrictions or preferences on some of the available resource blocks or resource-block sets due to inter-cell interference coordination (ICIC) considerations.

The RRM may also include modules for inter-cell interference coordination (ICIC), load balancing, Inter-RAT radio resource management, and subscriber profile ID (SPID).

The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMES and S-GWs. The eNodeB 106 selects an MME from a group of MMES so the load can be shared by multiple MMES to avoid congestion.

Wireless communication networks are widely deployed to provide various communication services such as voice, video, packet data, messaging, broadcast, or the like. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

As discussed above with reference to FIG. 1B, a wireless communication network may include a number of network entities, such as base stations, that can support communication for a number of mobile entities/devices, such as, for example, user equipments (UEs) or access terminals (ATs). A mobile entity may communicate with a base station via a downlink and uplink. The downlink (or forward link) refers to the communication link from the base station to the UE, and the uplink (or reverse link) refers to the communication link from the UE to the base station.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a way to convey both data and control information between a base station, such as an evolved Node B (eNB), and a mobile entity, such as a UE, with increased spectral efficiency and throughput.

In the context of LTE, information may be delivered among network entities and mobile entities as media access control (MAC) protocol data units (PDUs) and radio link control (RLC) PDUs, wherein a given RLC PDU may include at least one RLC service data unit (SDU) or RLC SDU segment. In unicast, the maximum RLC SDU size is specified in a Packet Data Convergence Protocol (PDCP).

In general, a radio access network (RAN) implements a radio access technology. Conceptually, it resides between a device such as a mobile phone, a computer, or any remotely controlled machine and provides connection with its core network (CN). Depending on the standard, mobile phones and other wireless connected devices are varyingly known as user equipment (UE), terminal equipment, mobile station (MS), and so forth. The RAN functionality is typically provided by a silicon chip residing in a node such a eNodeB which resides between the CN and the UE. RAN is used by GSM/UMTS/LTE systems, e.g., for example, GERAN (GSM RAN), UTRAN (UMTS Terrestrial RAN), and E-UTRAN (Enhanced UTRAN) are the GSM, UMTS, and LTE radio access networks.

The radio access network including the base stations provided therein is responsible for handling all radio-related functionality including scheduling of radio resources. The core network may be responsible for routing calls and data connections to external networks.

The scheduler in a base station, such as an eNodeB, is generally responsible for assigning radio resources to all UEs and radio bearers both in uplink and downlink. The scheduler in an eNB allocates radio resource blocks (which are the smallest elements of resource allocation) to users for predetermined amounts of time. Generally, a resource block in an LTE system corresponds to one sub-carrier over one OFDM symbol. According to some implementations, a base station, such as an eNodeB, includes an application aware scheduler module within the base station.

Data packets in a communication network may correspond to different applications having different, and in some instances, non-standardized formats for the underlying data payload. Without knowledge of the data packet payload, and its corresponding application, coordination of communication of a data packet is provided in a generic fashion. At the base station, such as an eNodeB, assignment of radio resource blocks occurs at approximately 1 ms intervals. Detection of packet data and corresponding applications outside of the base station, such as using devices in the core network or at the user device, cannot accurately account for changes in the channel conditions that occur at the 1 ms intervals at which the base station assigns radio resource blocks. For example, a base station, such as an eNodeB, may decide the type of modulation encoding mechanism for a data packet transmission, for example, using quadrature amplitude modulation QAM—including 16-QAM, 64-QAM, or the like) and/or quadrature phase shift keying (QPSK) every 1 ms. Such decisions are traditionally based on the channel conditions present during the time slice at which the base station is assigning the radio resource blocks. Using the current subject matter, knowledge of the underlying data to be transmitted can also be used to determine an appropriate modulation and coding scheme. Moreover, knowledge of the underlying data can be used to select a modulation and coding scheme that is conservative (e.g., robust), for example, when a data packet is considered important.

In one example of the application awareness capability as will be described in greater detail below, a Deep Packet Inspection (DPI) function is performed by the base station (e.g., eNodeB) for inspecting data packets at any of the layers (e.g., from layer 3 (L3) to layer 7 (application layer)). The packet inspection along with application intelligence functions are utilized by the base station to make inferences and/or determinations based on, for example, rule sets provisioned in the base station. Based on these inferences derived from the DPI function and application intelligence function, the processing to be applied on a data packet is determined. As an example, if the data packet contains a HTTP URL, and the rule set indicates a detection of a specific URL, e.g. http://some-domain.com, the DPI function will have to first detect that the packet contains HTTP payload by inspecting the layer 4 destination port number, then inspect layer 7 for a URL match for http://some-domain.com. If there is a match, the application intelligence function will apply a particular process as indicated by the rule set, e.g., mark the packet during robust downlink treatment for scheduling by the base station. This type of functionality implementation requires a particular hardware design and CPU capacity to sustain the compute demand on a per packet basis. Therefore, according to some implementations, in order to implement an application aware scheduler in the base station (e.g., eNodeB), the implementation of and requirements for a DPI capability are utilized to determine the base station design. As one implementation, with returned reference to FIG. 3, the base station for a macro network, such as a 3G or 4G LTE network, is split between the intelligent baseband unit (iBBU) 304 and intelligent RRH (iRRH) 302, such that the packet inspection would be performed by an actively cooled iBBU 304 which is separate from a passively cooled iRRH 302. Other implementations may also be provided utilizing processors that are capable of performing the software intensive packet inspection processes while complying with the thermal constraint of the processors and the node.

According to another implementation, a DPI and application intelligence capability may be implemented outside of the base station, e.g., at a Packet Data Network Gateway (PDN-GW), and/or a dedicated node designed to perform DPI and application intelligence in the core network or access network responsible for doing the packet inspection and inferences. In this implementation, the inference based on the packet inspection may then be conveyed to the base station (e.g., eNodeB) in order to process the data packet accordingly. In this implementation, the time gap between detection of the data packet, inspection/determination of the inference (e.g., application type), and the processing by the base station is greater than in the implementation in which packet inspection occurs at the base station. Moreover, the core network nodes do not have base station (e.g., eNodeB) control plane (RRC) and Radio Resource Management (RRM) functionality to make the correct inference and/or determination for a given packet. For example, knowledge of the level of radio resource availability which is in the RRM and the number of active users camped on a eNodeB which is in the RRC modules are essential for the packet inspection and marking processor to make appropriate marking of the packet.

Implementing the packet inspection at the base station as described according to some embodiments overcomes these challenges by locating the DPI function with inspection determination functions performed by the same hardware that hosts the base station's control plane (RRC) and Radio Resource Management (RRM) functions.

According to some implementations, in order to accurately assign radio resource blocks based on the real-time channel conditions at the base station, the base station includes a module and/or processor for inspecting the data packet, including the application type of the data packet, a module for determining whether to apply robust downlink delivery techniques, and a module and/or processor for scheduling and assigning radio resource blocks based on the inspection and robust downlink delivery determination. This application aware scheduling is different from conventional scheduling mechanisms for at least the reason that conventional scheduling techniques (e.g., scheduling techniques for default bearers) may not take into account application type and do not conduct packet inspection at the base station. Moreover, conventional scheduling techniques may not select modulation coding schemes based on the application type and inspected data packet.

Figure 4:
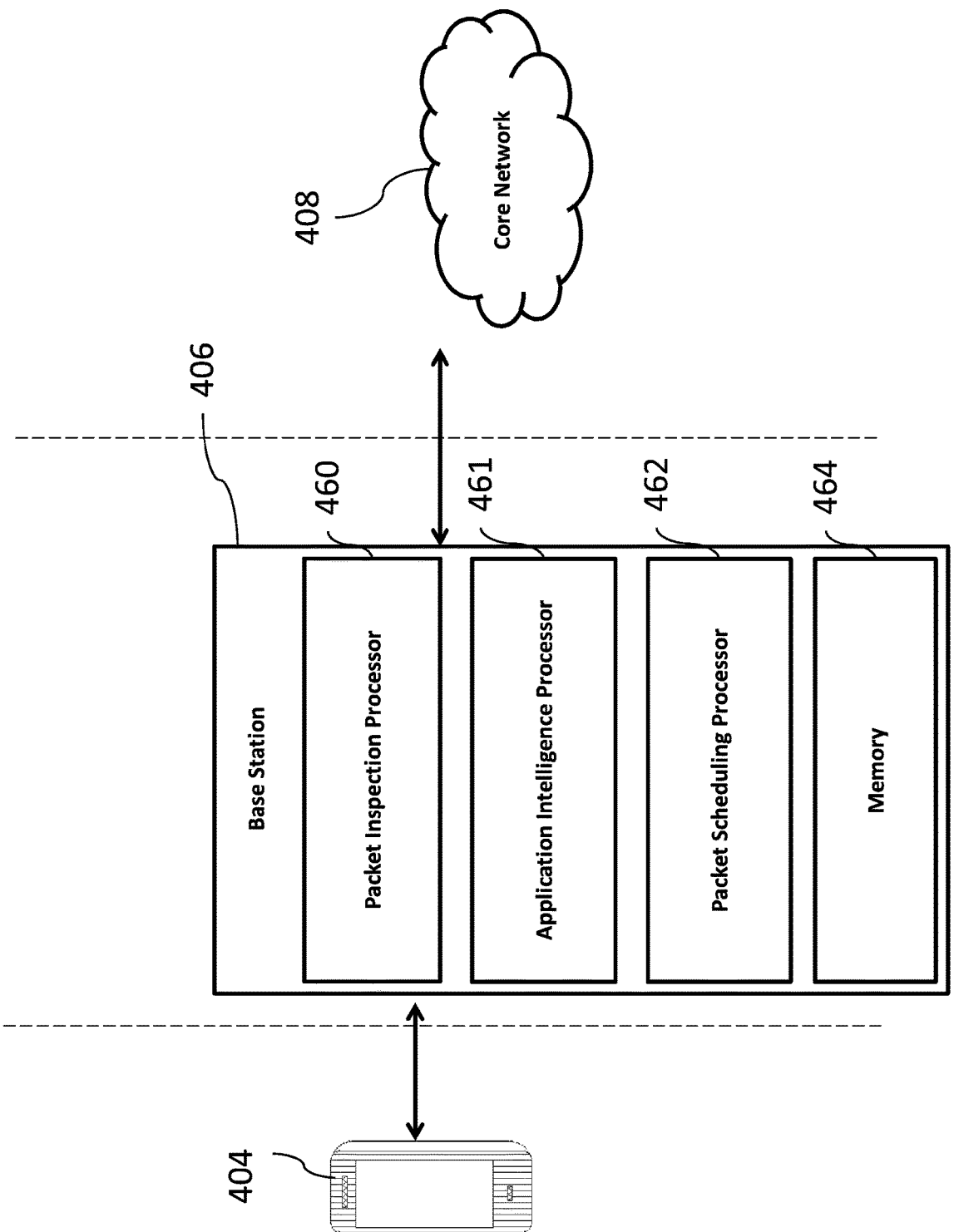
FIG. 4 illustrates an example of a base station for coordinating communication between a user equipment and an application server according to some implementations.

FIG. 4 illustrates an example of a base station 406 for coordinating communication between a user equipment 404 and an application server 408 according to some implementations. The base station 406 may correspond to an eNodeB, such as an eNodeB as shown and described above with reference to FIGS. 1B-1D, 2, and 3. In the case of a C-RAN architecture such as that shown in FIG. 3, the base station 406 is split between the intelligent baseband unit (iBBU) 304 and intelligent RRH (iRRH) 302 unit as shown in FIG. 3. The base station 406 includes a packet inspection processor 460, an application intelligence processor 461, a packet scheduling processor 462, and a memory 464. While shown as separate components in FIG. 4, the packet inspection processor 460, application intelligence processor 461, the packet scheduling processor 462, and the memory 464 may be integrated in one or more processing components. In some implementations, the packet inspection processor 460, application intelligence processor 461, and the packet scheduling processor 462 may be provided as software modules in a processor that is specifically programmed to implement the functions described herein with reference to these processors.

In some implementations, the packet inspection processor 460 and/or application intelligence processor 461 may include one or more server class CPUs (e.g., Intel Xeon®) or embedded CPUs (e.g., Cavium Octeon® or Broadcom XLP®. In some implementations, the packet scheduling processor 462 may include one or more digital signal processors (DSPs), for example TI Keystone II® or Cavium Octeon Fusion® processors. The packet inspection processor 460, application intelligence processor 461, and packet scheduling processor 462 may include software and/or firmware for programming these devices along with any hardware components (e.g., logic gates, accelerators, memory, or the like) that these processors may include.

In some implementations, the packet inspection processor 460 is configured to perform a packet inspection on each data packet that is transmitted between the user equipment 404 and the application server 408 in order to determine, for example, the application type of the data packet. An application type may correspond to, for example, audio, video, email, or the like. The application type may also be specific to a particular provider of the data, for example, YouTube® video distinguished from Netflix® video. The packet inspection processor 460 may determine a priority value of a data packet, a delay sensitivity of the data packet, and/or a loss sensitivity of the data packet. For example, different Modulation Coding Scheme (MCS) indices may be utilized, for example, in order to include additional redundancies and a lower order modulation for data packets that are, according to the settings of the base station, deemed more important and/or sensitive than other data packets. For example, an MCS index having higher reliability may be utilized for synchronization and/other state transition/communication setup data packets than for data transfer packets in a communication session.

For example, if the data packet is carrying delay sensitive information for the user's application such as a response to a Domain Name System (DNS) query, the application intelligence processor 461 may determine that a robust downlink delivery scheme should be used for transmitting the data packet and indicate to the packet scheduling processor 462 that the packet is to be transmitted using a more conservative MCS (e.g., lower MCS index) so that delivery of the packet is achieved using fewer transmissions (e.g., fewer retransmissions). As another example, streaming VoIP application packet (e.g., internet radio) generally has lower loss and delay sensitivity relative to a conversational VoIP packet (e.g., Skype®). In this example, the application intelligence processor 461 may determine and indicate that the packet requires transmission with a lower Modulation Coding Scheme (MCS) index. MCS or other scheduling parameters may be provisioned based on pre-set or dynamic settings stored in the base station memory 464 that correlate scheduling settings with packet inspection results.

In some implementations, the packet inspection may be one of a shallow packet inspection (SPI) and/or a deep packet inspection (DPI). A shallow packet inspection may be performed by inspecting one or more headers of the data packet to determine some information associated with the data packet. For example, the shallow packet inspection may inspect the IP header of the data packet in order to determine the source IP address of the data packet. Based on the shallow packet inspection, in some implementations, the packet inspection processor 460 may perform a deep packet inspection, for example by examining other layers of the data packet. For example, the deep packet inspection may include an inspection of one or more of layers 1-7 of an open systems interconnect (OSI) model data packet. In some implementations, the packet inspection processor 460 may inspect the payload of a data packet, the application intelligence processor 461 may determine how the data packet should be assigned a radio resource block by the packet scheduling processor 462. In some implementations, the packet inspection processor 460 may be configured to perform shallow packet inspection for all incoming and outgoing packets, while performing deep packet inspection on a subset of packets based on the settings that are stored in or provided to the base station.

In some implementations, the packet inspection processor 460 may determine the state of the application to which the data packets being communicated correspond. For example, by examining a data packet header (e.g., in Layer 7)), the packet inspection processor 460 may determine if the application is in a setup/establishment state or a connected/streaming state for communication. As one example, for a TCP communication session, TCP synchronization packets are exchanged during a TCP connection establishment state prior to TCP data transfer. The packet inspection processor 460 may determine that a data packet corresponds to a TCP synchronization packet that is communicated during the TCP establishment state, and in response, the application intelligence processor 461 marks the data packet for higher reliability MCS coding relative to an unmarked data transfer packet. As a result, data packets including state transition information may be scheduled and communicated accordingly, thereby reducing time required to transition a communication session from an establishment state to a data transfer state (congestion avoidance state for TCP) for lossy channel conditions. Using a conservative MCS can maintain or increase the time required for transition establishment state to data transfer state for TCP.

Packet inspection processor 460 communicates the detected application type and/or other information (e.g., application state) that is derived from the data packet to application intelligence processor 461. Application intelligence processor 461 may determine whether the packet should be transmitted using a robust (e.g., conservative) MCS. A robust MCS is one that provides greater reliability for fixed channel conditions relative to an MCS used by a conventional scheduler (e.g., the robust MCS has a lower index than would otherwise be used). The determination may be based on the information detected through inspection of the data packet. Application intelligence processor 461 may use application type, the size of the file associated with the data packet, the provider of the content, the user device type or profile information associated with the user to make inference for treatment by the packet scheduling processor 462. Application intelligence processor 461 may send an enable instruction or signal to the packet scheduling processor 462 indicating that a conservative MCS should be used for scheduling and transmitting the data packet.

Packet scheduling processor 462 may assign radio resource blocks including selecting an appropriate and robust MCS based on predefined settings stored in memory 464 corresponding to the enable instruction.

With returned reference to FIGS. 2 and 3, the packet inspection processor 460 and/or application intelligence processor 461 may correspond to a function that is part of layer 3 functions in the base station 106, 306. In some implementations, the packet inspection processor 460 and/or application intelligence processor 461 may also be provided on a separate functional layer from the functional layers described with reference to FIGS. 2 and 3. The packet inspection processor 460 and/or application intelligence processor 461 may be configured to communicate and coordinate with other functions performed by the base station 406. For example, the packet inspection processor 460 and/or application intelligence processor 461 may coordinate with the radio resource management (RRM) functions described above with reference to FIG. 2.

In some implementations, the packet inspection processor 460 and/or application intelligence processor 461 may interact with Radio Resource Management (RRM) of the base station to gauge traffic load on the base station. Based on the traffic load, the application intelligence processor 461 may modify the determinations (e.g., whether to implement robust downlink delivery) for packet scheduling. For example, during heavy load conditions, the application intelligence processor 461 may indicate that a packet is not to be transmitted using robust downlink delivery if it corresponds to a given set of applications.

In some implementations, the packet inspection processor 460 and/or application intelligence processor 461 may interact with the Self Organizing Network (SON) and the RRM functions to enhance handover performance of a given application. For example, the packet inspection processor 460 and/or application intelligence processor 461 may utilize the statistics and data collection module in the base station to gather application specific Key Performance Indicators (KPIs), including, for example, indicators for accessibility, retainability, integrity, availability, and/or mobility.

In some implementations, the packet scheduling processor 462 may be provided in layer 2 of the base station as shown in FIGS. 2 and 3. In those implementations in which functions of layer 2 are subdivided between the iBBU 306 and RRHs 302, the packet scheduling processor 462 may be implemented as part of the layer 2 functions that remain with the iBBU 306. The packet scheduling processor 462 may also be provided on a separate functional layer from the functional layers described with reference to FIGS. 2 and 3. The packet scheduling processor 462 may be configured to communicate and coordinate with other functions performed by the base station 406. In some implementations, the packet scheduling processor 462 may coordinate with the MAC layer, and in particular the hybrid automatic repeat request (HARQ) manager of the MAC layer, as well as with a physical layer of the base station. For example, the packet scheduling processor 462 may interact with the physical (PHY) layer to derive channel estimations before selecting a modulation and coding scheme (MCS) for a given resource block which will carry part of the data related to a given application. In some implementations, the packet scheduling processor 462 selects the MCS for a particular data packet or set of data packets based on the information it receives from all other layers in the base station functional framework, including the PHY layer and presence or absence of the robust downlink delivery enable signal from the application intelligence processor 461.

In some implementations, the base station, such as an eNodeB, may assign radio resource blocks within a default bearer based on an application type or other data that is determined from inspecting the data packet. In an LTE or other telecommunication system, there are two types of evolved packet systems (EPS) bearers: the default EPS bearer and the dedicated EPS bearer. The default EPS bearer is established during the attach procedure and allocates an IP address to the UE that does not have a specific QoS (only a nominal QoS). A dedicated EPS bearer is typically established during call setup and after transition from idle mode to the connected mode for a specific purpose such as carrying application or transactions with a set QoS. It does not allocate any additional IP address to the UE and is linked to a specified default EPS bearer but has a specific QoS class. A QoS class identifier (QCI) is a scalar that may be used as a reference to access node-specific parameters that control bearer level packet forwarding (e.g., scheduling weights, admission thresholds, queue management thresholds, and link layer protocol configuration), and are preconfigured by the operator owning the access node (eNB).

According to some implementations (e.g., LTE based implementations), the default bearer utilized by the packet scheduling processor 462 is a generic bearer (non-guaranteed bit rate (GBR)). There are many applications and application domains that contend for resources on the default bearer and there is generally no 3GPP® defined differentiation. These include, for example, Email, YouTube®, SKYPE®, GoToMeeting Web browsing, News feeds, audio and/or video streaming from the internet, and applications available through iTunes® and other application stores (e.g., Google Play®, Samsung Hub®, or the like). However, not all applications need GBR.

Figure 5:
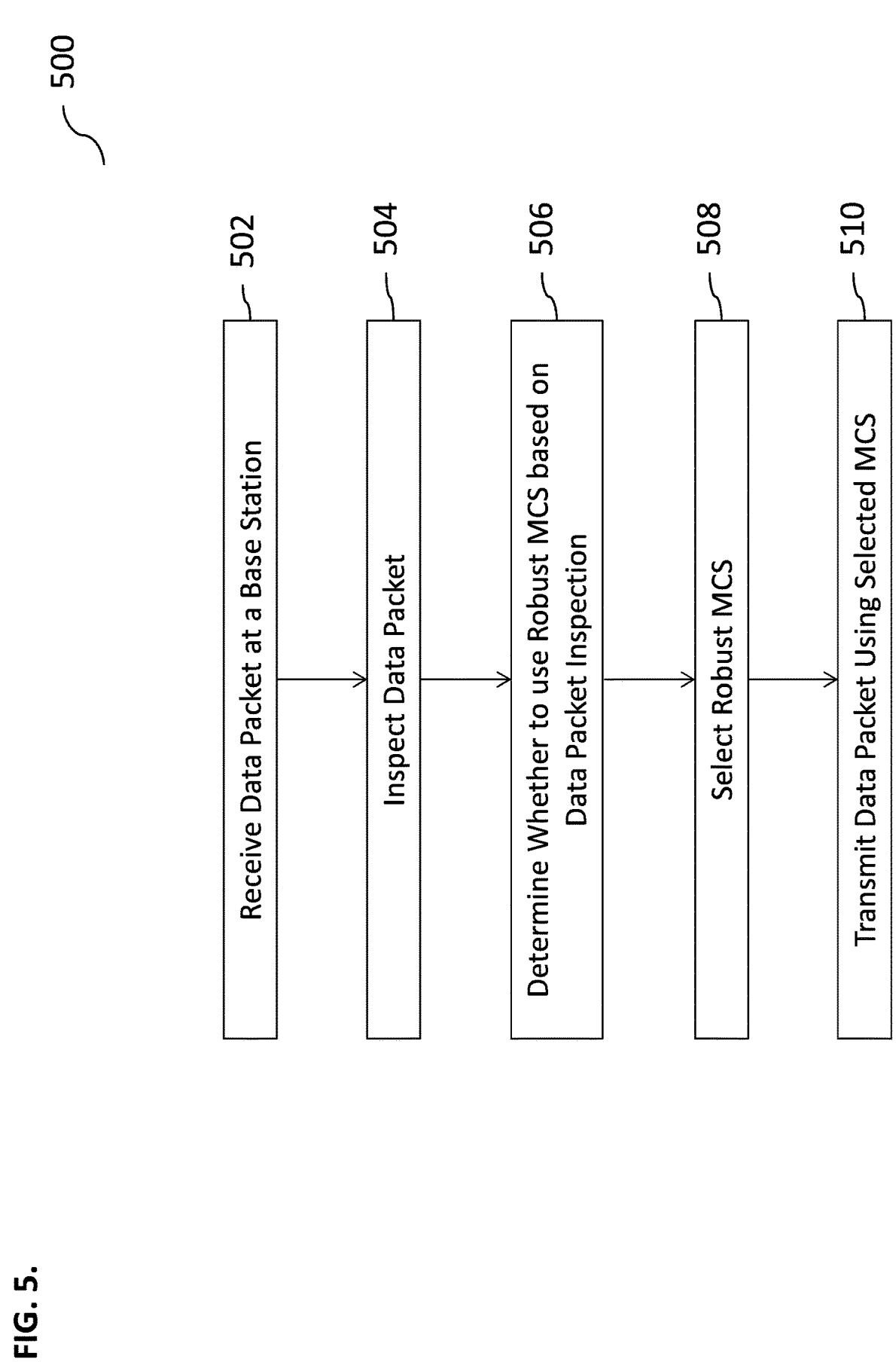
FIG. 5 is a process flow diagram illustrating a method of performing robust downlink delivery to user equipment according to an example implementation.

FIG. 5 is a process flow diagram illustrating a method 500 of performing robust downlink delivery to user equipment according to an example implementation. The method 500 shown in FIG. 5 may be performed, for example, by a base station 406 as shown and described with reference to FIG. 4. As shown in FIG. 5, the method 500 includes receiving a data packet at a base station at 502. The data packet is for delivery to the user equipment. The base station may include an eNodeB base station in an LTE network as described above.

At 504, the data packet can be inspected. Inspection of the data packet can determine an application type of the data packet and an application state, which can include a data establishment state and a data transfer state. Data packets can be inspected upon arrival at the base station. As part of the inspection, the packet header and payload may be inspected.

At 506, whether to use a robust downlink delivery scheme can be determined. The determination can be based on the data packet inspection. For example, if the data packet includes a particular application type, then it can be determined that the data packet can be transmitted using robust downlink delivery. The determination can be made by an application intelligence processor, which can generate a robust downlink delivery enable instruction. The determination can include using a rules engine having predefined rules.

At 508, a robust MCS can be selected for the data packet. The robust MCS can be selected from a predefined and/or configurable MCS index values. The robust MCS can have a lower MCS index for a fixed channel quality than a non-robust MCS so that transmissions using a robust MCS are more reliable (e.g., more robust) than transmissions using a non-robust MCS (e.g., a higher index MCS). The selection of a robust MCS over a non-robust MCS can be performed when the enable instruction is received from the application intelligence processor. A packet scheduling processor can select the robust MCS.

At 510, the data packet can be transmitted to the user equipment utilizing the selected robust MCS. The data packet can be transmitted from a base band unit to a remote radio head including a radio transmitter and a radio receiver.

Figure 6:
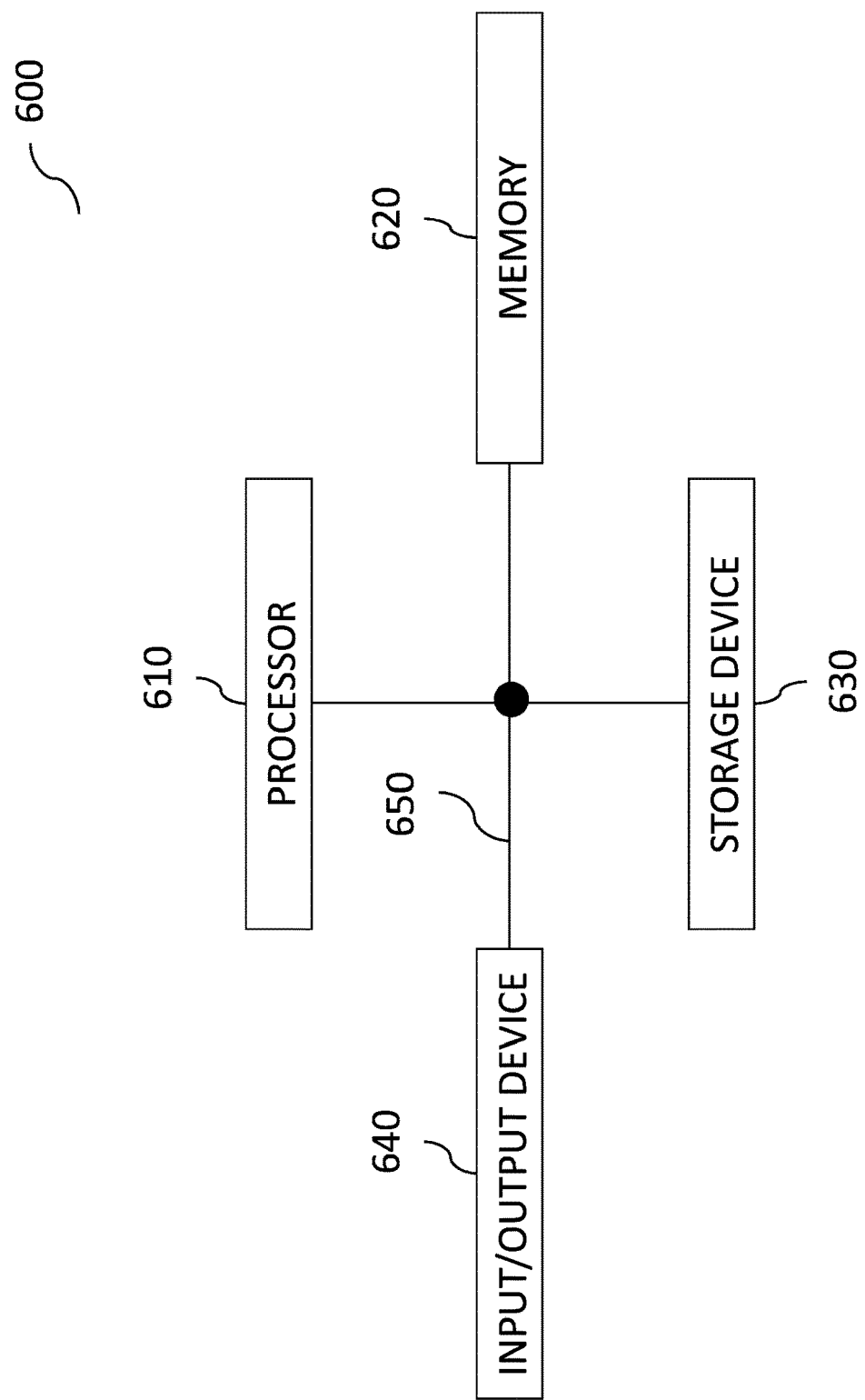
FIG. 6 illustrates an exemplary system, according to some implementations of the current subject matter.

In some implementations, the current subject matter can be configured to be implemented in a system 600, as shown in FIG. 6. The system 600 can include one or more of a processor 610, a memory 620, a storage device 630, and an input/output device 640. Each of the components 610, 620, 630 and 640 can be interconnected using a system bus 650. The processor 610 can be configured to process instructions for execution within the base station 406. In some implementations, the processor 610 can be a single-threaded processor. In alternate implementations, the processor 610 can be a multi-threaded processor. The processor 610 can be further configured to process instructions stored in the memory 620 or on the storage device 630, including receiving or sending information through the input/output device 640. The memory 620 can store information within the system 600. In some implementations, the memory 620 can be a computer-readable medium. In alternate implementations, the memory 620 can be a volatile memory unit. In yet some implementations, the memory 620 can be a non-volatile memory unit. The storage device 630 can be capable of providing mass storage for the system 600. In some implementations, the storage device 630 can be a computer-readable medium. In alternate implementations, the storage device 630 can be a floppy disk device, a hard disk device, an optical disk device, a tape device, non-volatile solid state memory, or any other type of storage device. The input/output device 640 can be configured to provide input/output operations for the system 600. In some implementations, the input/output device 640 can include a keyboard and/or pointing device. In alternate implementations, the input/output device 640 can include a display unit for displaying graphical user interfaces.

Various aspects of embodiments within the scope of the appended claims are described below. It should be apparent that the aspects described herein may be embodied in a wide variety of forms and that any specific structure and/or function described herein is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc.

A TDMA network may implement a radio technology such as Global System for Mobile Communications (GSM). An OFDMA network may implement a radio technology such as Long Term Evolution (LTE), Evolved UTRA (E-UTRA), IEEE 802.11, IEEE 802.16, IEEE 802.20, IEEE 802.22, Flash-OFDMA, etc. UTRA, E-UTRA, and GSM are part of Universal Mobile Telecommunication System (UMTS).

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency.

In some aspects the teachings herein may be employed in a network that includes macro scale coverage (e.g., a large area cellular network such as a 3G or 4G network, typically referred to as a macro cell network) and smaller scale coverage (e.g., a residence-based or building-based network environment). As an access terminal (AT) or user equipment (UE) moves through such a network, the access terminal may be served in certain locations by access nodes (ANs) that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB (HNB), Home eNodeB (HeNB), access point base station, femto cell, and so on.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In summary, it should be appreciated that a computer-readable medium may be implemented in any suitable computer-program product.

The various illustrative logical blocks, modules, and circuits described in connection with the aspects disclosed herein and in connection with FIGS. 1A-D, and 2-6 may be implemented within or performed by an integrated circuit (IC). The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A computer implemented method, the method comprising:
receiving a data packet at a base station; and
determining, at the base station and based on at least one of an application type of the data packet and an application state corresponding to the data packet, whether the data packet should be transmitted using a robust delivery technique and, if so, selecting one of a plurality of robust delivery techniques and transmitting the data packet from the base station to user equipment using the selected one of the plurality of robust delivery techniques;
wherein a packet inspection processor of the base station communicates the determined at least one of the application type and the application state to an application intelligence processor of the base station; and
the application intelligence processor determines whether the data packet should be transmitted using the robust delivery technique.

2. The method of claim 1, wherein the robust data delivery technique is a robust modulation and coding scheme (MCS); and
the plurality of robust delivery techniques are a plurality of robust MCSs.

3. The method of claim 2, wherein at least one MCS in the plurality of robust MCSs is a robust MCS having a lower MCS index for a fixed channel quality than a non-robust MCS.

4. The method of claim 1, wherein the packet inspection processor determines the at least one of the application type of the data packet and the application state corresponding to the data packet.

5. The method of claim 4, wherein the packet inspection processor determines, using a rule set provisioned at the base station, the at least one of an application type of the data packet and an application state corresponding to the data packet.

6. The method of claim 5, wherein the rule set includes a rule defining use of a robust downlink delivery when the data packet is carrying a response to a Domain Name System (DNS) query.

7. The method of claim 1, wherein the application type corresponds to at least one of audio, video, email, and a particular data provider.

8. The method of claim 1, wherein the application state includes at least one of a data establishment state and a data transfer state.

9. The method of claim 1, wherein the base station is an evolved node (eNodeB) base station, the eNodeB base station comprising at least one processor and at least one memory.

10. The method of claim 9, wherein the at least one processor includes the packet inspection processor and the application intelligence processor; and
the method further comprises determining the at least one of the application type of the data packet and the application state corresponding to the data packet.

11. The method of claim 1, wherein a packet scheduling processor selects the one of the plurality of robust delivery techniques based on receipt of an enable instruction from the application intelligence processor.

12. The method of claim 1, wherein determining whether the data packet should be transmitted using the robust delivery technique is performed on each data packet received at base station.

13. The method of claim 1, wherein the transmitting further comprises transmitting the data packet to a remote radio head including a radio transmitter and a radio receiver.

14. The method of claim 1, further comprising, in response to determining that the data packet should not be transmitted using a robust delivery technique, transmitting the data packet from the base station to user equipment using a non-robust modulation and coding scheme (MCS).

15. A system, comprising:
at least one data processor; and
a memory storing instructions which, when executed by the at least one data processor, causes the at least one data processor to perform operations comprising:
receiving a data packet at a base station, and
determining, at the base station and based on at least one of an application type of the data packet and an application state corresponding to the data packet, whether the data packet should be transmitted using a robust delivery technique and, if so, selecting one of a plurality of robust delivery techniques and transmitting the data packet from the base station to user equipment using the selected one of the plurality of robust delivery techniques,
wherein a packet inspection processor of the base station communicates the determined at least one of the application type and the application state to an application intelligence processor of the base station; and
the application intelligence processor determines whether the data packet should be transmitted using the robust delivery technique.

16. The system of claim 15, wherein the robust data delivery technique is a robust modulation and coding scheme (MCS); and
the plurality of robust delivery techniques are a plurality of robust MCSs.

17. The system of claim 16, wherein at least one MCS in the plurality of robust MCSs is a robust MCS having a lower MCS index for a fixed channel quality than a non-robust MCS.

18. The system of claim 15, wherein the packet inspection processor determines the at least one of the application type of the data packet and the application state corresponding to the data packet.

19. The system of claim 18, wherein the packet inspection processor determines, using a rule set provisioned at the base station, the at least one of an application type of the data packet and an application state corresponding to the data packet.

20. The system of claim 19, wherein the rule set includes a rule defining use of a robust downlink delivery when the data packet is carrying a response to a Domain Name System (DNS) query.

21. The system of claim 15, wherein the application type corresponds to at least one of audio, video, email, and a particular data provider.

22. The system of claim 15, wherein the application state includes at least one of a data establishment state and a data transfer state.

23. The system of claim 15, wherein the base station is an evolved node (eNodeB) base station, the eNodeB base station comprising at least one processor and at least one memory.

24. The system of claim 23, wherein the at least one processor includes the packet inspection processor and the application intelligence processor; and the operations further includes determining the at least one of the application type of the data packet and the application state corresponding to the data packet.

25. The system of claim 15, wherein a packet scheduling processor selects the one of the plurality of robust delivery techniques based on receipt of an enable instruction from the application intelligence processor.

26. The system of claim 15, wherein determining whether the data packet should be transmitted using the robust delivery technique is performed on each data packet received at base station.

27. The system of claim 15, wherein the transmitting further comprises transmitting the data packet to a remote radio head including a radio transmitter and a radio receiver.

28. The system of claim 15, wherein the operations further comprise, in response to determining that the data packet should not be transmitted using a robust delivery technique, transmitting the data packet from the base station to user equipment using a non-robust modulation and coding scheme (MCS).

29. A non-transitory computer program product storing instructions, which when executed by at least one data processor of at least one computing system, implement a method comprising:

receiving a data packet at a base station; and determining, at the base station and based on at least one of an application type of the data packet and an application state corresponding to the data packet, whether the data packet should be transmitted using a robust delivery technique and, if so, selecting one of a plurality of robust delivery techniques and transmitting the data packet from the base station to user equipment using the selected one of the plurality of robust delivery techniques;

wherein a packet inspection processor of the base station communicates the determined at least one of the application type and the application state to an application intelligence processor of the base station; and the application intelligence processor determines whether the data packet should be transmitted using the robust delivery technique.

\* \* \* \* \*